Patented Oct. 7, 1941

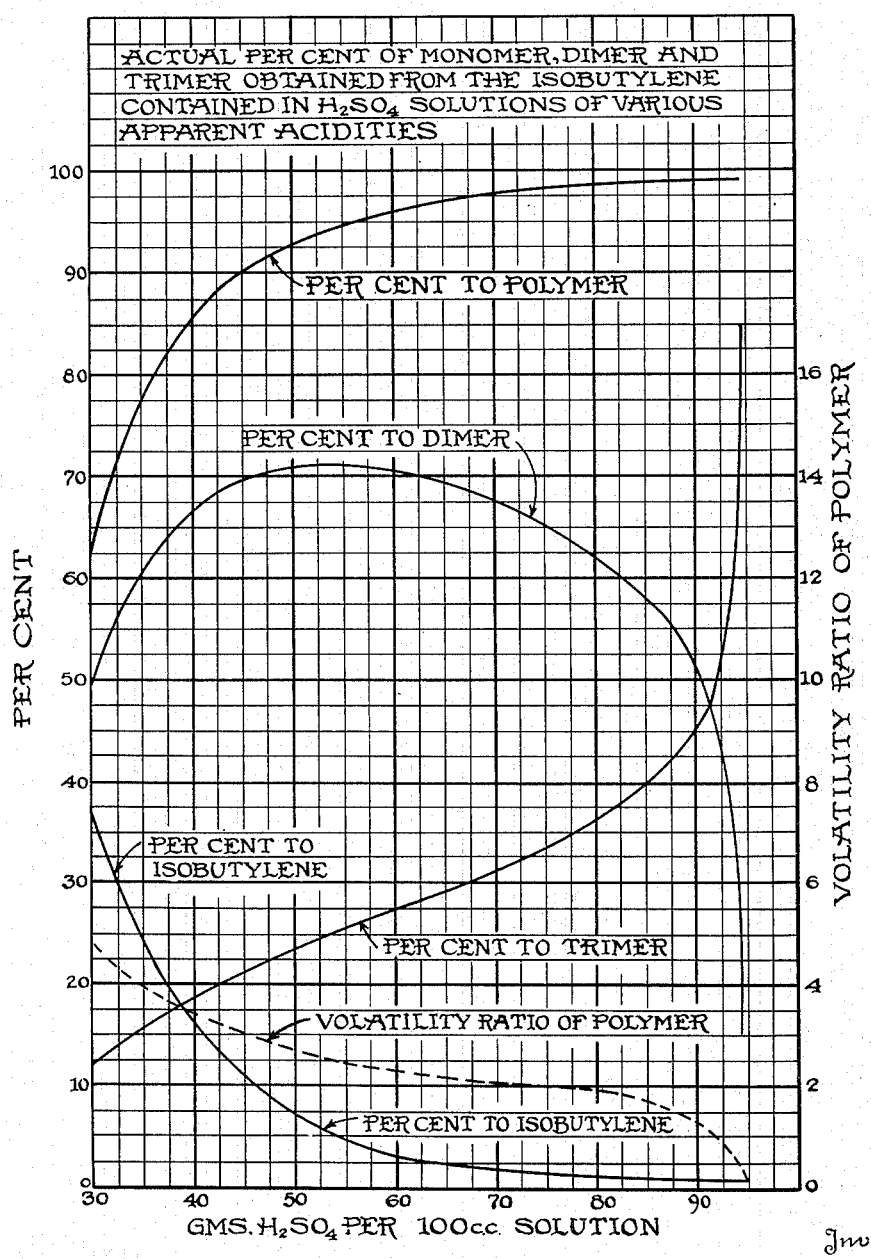

2,258,368

UNITED STATES PATENT OFFICE 2,258,368

MAKING MOTOR FUEL

Donald R. Stevens, Swissvale, and William A. Gruse, Wilkinsburg, Pa., assignors to Gulf Research & Development Company, Pittsburgh, Pa., a corporation of Delaware Application January 19, 1938, Serial No. 185,762

12 Claims. (Cl. 260—683)

This invention relates to making motor fuel; and it comprises a method of extracting iso-butylene by contacting mixtures containing the same with sulfuric acid and absorbing the iso-butylene, the acid charged with the iso-butylene being warmed to produce polymerization and separation of the iso-butylene as di-iso-butylene and tri-iso-butylene, the acidity at the time of the polymerization being equal to an apparent acidity of 45 to 95 grams of $H_2SO_4$ per 100 cc. of the charged acid solution; and, when the maximum yield of di-iso-butylene is wanted the apparent acidity being 45 to 70 grams of $H_2SO_4$ per 100 cc. of the charged acid solution, or if the maximum yield of tri-iso-butylene is wanted the acidity being preferably equal to an apparent acidity of 90 to 95 grams of $H_2SO_4$ per 100 cc. of the charged acid solution; the apparent acidity desired being sometimes obtained by limiting the amount of iso-butylene contacted with a given amount of the sulfuric acid and sometimes obtained by adding to the acid solution, after charging, more sulfuric acid of higher apparent acidity than the charged acid; all as more fully hereinafter set forth and as claimed.

In cracking petroleum oils there is a production of substantial amounts of 4-carbon hydrocarbons; the butanes and butylenes or butenes. Because of their high volatility they are not wanted to any great extent in ordinary grades of gasoline and it is frequent practice to remove them by distillation from the condensates made in pressure cracking; this distillation giving what is known as the "butane cut" or the "C₄" cut. It is an extremely volatile liquid developing in a closed container about 50 pounds vapor pressure at ordinary air temperatures. Similar liquids are obtained in "debutanizing" gases from cracking operations, these gases containing liquefiable vapors corresponding to the butane cut. One constituent of the butane cut which is quite different in its properties from the other butylenes present is iso-butylene. This can be polymerized into the dimer, di-iso-butylene; and the trimer, tri-iso-butylene; both being obtainable as pure materials. Di-iso-butylene is a particularly valuable fuel for engine purposes; as an aviation gasoline and as an addition to other gasolines. It has an extremely high "octane number" and is useful as a blending agent for admixture with ordinary gasoline. Its boiling point, 215° F., makes it right for high class engine fuel purposes. The trimer is also a valuable material for fuel purposes, but its boiling point, 349° F. (176° C.), puts it outside the ordinary aviation gasoline range. It has a high octane value. Both the dimer and the trimer, as pure materials readily made from petroleum sources, have value as intermediates in the preparation of various carbon compounds. The trimer finds use as a special solvent and as a "safety fuel."

The iso-butylene, which ordinarily forms 10 to 35 per cent of the butane cut, is readily removed and polymerized by the old Butlerow method (Annalen, 1877, vol. 189, page 44 et seq.), which in substance consists in taking up the iso-butylene in a diluted sulfuric acid made by mixing equal volumes of concentrated sulfuric acid and water and polymerizing by warming the solution formed. This diluted acid contains about 62 per cent by weight of sulfuric acid or 95 grams of $H_2SO_4$ per 100 cc. of solution. When the sulfuric acid dissolves large amounts of iso-butylene it increases in bulk. When fully charged the volume of the acid approaches triple the volume of the original acid. This fully charged acid contains considerably more iso-butylene than corresponds to the sulfuric acid present. The apparent acidity of the iso-butylene-sulfuric acid solution is substantial.

On warming the sulfuric acid solution obtained by Butlerow there occurs a separation of an oily layer, which is a mixture of polymers consisting mostly of di-iso-butylene with a less amount of tri-iso-butylene. In addition there is some unchanged iso-butylene evolved. By working hot the iso-butylene, di-iso-butylene and tri-iso-butylene can be vaporized and collected separately. After the Butlerow process is complete the sulfuric acid can be cooled and sent back for re-use. Recycling of the sulfuric acid can be repeated indefinitely, provided no side reactions take place during the process. Whether or not side reactions will take place depends largely on the particular composition of the butane cut being treated. The acid may react with other butylenes present to form some secondary butyl sulfuric acid which will accumulate and may ultimately necessitate a change in the acid. When this happens the acid containing the secondary butyl sulfuric acid can be slightly diluted with water and butyl alcohol distilled off, leaving the sulfuric acid in condition for further use in the process. As a matter of fact, it may be advantageous to increase the amount of secondary butyl sulfuric acid formed, the butyl alcohols being valuable by-products.

We have found that the proportion of iso-butylene present in an iso-butylene-sulfuric acid solution which will be polymerized on heating and the relative proportions of dimer and trimer so produced can be adjusted by regulating the apparent acidity of the iso-butylene-sulfuric acid solution which is heated to produce polymerization. We have found that as the apparent acidity of the solution is increased from about 45 to 95 grams of $H_2SO_4$ per 100 cc. of iso-butylene-sulfuric acid solution the contained iso-butylene converted to polymer increases from about 90 per cent to 99 per cent. Also, as the apparent acidity of the iso-butylene-sulfuric acid solution is increased we have found that the ratio of dimer to trimer in the polymer formed is decreased. To secure the maximum yield of dimer, we have found that the acidity at the time of polymerization should be equal to about 45 to 70 grams $H_2SO_4$ per 100 cc. of iso-butylene-sulfuric acid solution, and to secure the maximum yield of trimer we have found that the apparent acidity at the time of polymerization should be about 90 to 95 grams of $H_2SO_4$ per 100 cc. of iso-butylene-sulfuric acid solution.

The apparent acidity of the iso-butylene-sulfuric acid solution may be adjusted to the desired strength either during or after absorption of the iso-butylene. One convenient way is to absorb the iso-butylene in the sulfuric acid in the ordinary way to any convenient concentration and then, before the solution is heated for polymerization, add sulfuric acid solution to bring the apparent acidity to the desired value, or the absorption of the iso-butylene in the sulfuric acid may be so regulated that the iso-butylene is absorbed in the acid only to such an extent as to give the resulting solution the required acidity. In any case, the sulfuric acid at the time of polymerization is not charged with iso-butylene to the maximum possible extent.

As the polymer is formed it separates from the acid solution, forming a supernatant liquid layer floating on the acid. These two layers may be readily separated by any convenient means and the polymer washed with dilute aqueous alkali solution to remove any retained acid. The polymer may then be fractionally distilled to separate the dimer from the trimer. The di-iso-butylene fraction is distilled and collected at temperatures up to 140° C. The tri-iso-butylene fraction is collected at temperatures above 140° C.

After removal of the iso-butylene from the "butane cut" by absorption in sulfuric acid as described, the remaining butylenes (unabsorbed in the acid) can be polymerized in other ways, also yielding valuable fuel products. One convenient way known in the art for producing polymerization of the polymerizable constituents of gases unabsorbed in the Butlerow process is to subject them to heat and pressure in the presence of concentrated phosphoric acid as a catalyst. This operation can be applied to the butylenes leaving the acid charging zone in the process of the present invention.

As an extension of the present invention, we have found that the polymerization of the butylenes is facilitated by the presence of iso-butylene. Accordingly, in a modification of the invention we provide for the presence of a little iso-butylene in the butylenes undergoing polymerization in the presence of phosphoric acid.

In a copending application Serial No. 109,026, filed November 3, 1936, there is disclosed and claimed an improved process for polymerizing the unabsorbed gases with the aid of phosphoric acid in admixture with a little sulfuric acid. This process may be applied to the unabsorbed gases taken from the absorption step in the present process.

In the present invention, absorption of the iso-butylene in the acid is ordinarily carried out at room temperature, say about 25° C.

The step of warming the iso-butylene-sulfuric acid solution to promote polymerization can be carried out either at atmospheric pressure or at high pressures. By working under a gage pressure in the polymerization chamber of about 65 to 115 pounds, the yield of polymer can be slightly increased and the ratio of dimer to trimer can be somewhat increased.

In the accompanying illustration, curves have been plotted showing some of the relations involved in our invention. Apparent acidity expressed in grams of $H_2SO_4$ per 100 cc. of iso-butylene solution is plotted on the line of the abscissae while percentage yields of polymer, of monomer, of dimer and of trimer are plotted along the ordinate. The ratio of dimer to trimer, hereinafter referred to as the volatility ratio of the polymer, is also plotted along the ordinate. The volatility ratio of the polymer produced upon warming an iso-butylene-sulfuric acid solution of any given apparent acidity can be defined as $$\frac{\text{Percentage of the polymer having boiling points up to 140° C. (284° F.)}}{\text{Percentage of the polymer having boiling points above 140° C. (284° F.)}}$$

A fully charged iso-butylene-sulfuric acid solution has an apparent acidity of 30 grams of sulfuric acid per 100 cc. of solution. By a fully charged iso-butylene-sulfuric acid solution is meant a 63 per cent by weight sulfuric acid solution saturated with iso-butylene at about 25° C. under a vapor pressure of iso-butylene equivalent to that of a refinery butane cut at that temperature. This pressure is usually about 45 to 50 pounds per square inch. The 63 per cent sulfuric acid solution before charging with iso-butylene has an apparent acidity corresponding to about 98 grams of $H_2SO_4$ per 100 cc. of solution. Thus it will be seen that the curves shown illustrate the relative yield of polymer, iso-butylene, di-iso-butylene and tri-iso-butylene produced when any solution of iso-butylene in 63 per cent by weight sulfuric acid, up to the saturation point, is warmed. It will be observed on inspection of these curves that as the apparent acidity of the iso-butylene-sulfuric acid solution is increased the amount of iso-butylene converted to polymer is increased and the amount of iso-butylene lost to vapor is correspondingly decreased.

It will be observed also that the volatility ratio of the polymer is greatest at the lowest acidity indicated (30 grams of $H_2SO_4$ per 100 cc. of iso-butylene-sulfuric acid solution). That is, at this acidity the proportional yield of di-iso-butylene to tri-iso-butylene is highest. However, under such conditions of acidity the total yield of polymer is relatively low. We have found it desirable, therefore, when producing a polymer which predominates in di-iso-butylene, to use an iso-butylene-sulfuric acid solution having an apparent acidity of about 45 to 70 grams of sulfuric acid per 100 cc. of solution. When it is desired to produce polymer containing a relatively large proportion of tri-iso-butylene it is advantageous to use iso-butylene-sulfuric acid solutions of relatively high apparent acidities. Iso-butylene-sulfuric acid solutions having apparent acidities between 90 and 95 grams of sulfuric acid per 100 cc. of solution, we have found, yield the greatest percentage of tri-iso-butylene.

Table I presents some of the data from which the curves shown in the drawing were produced. In this table there are shown the actual percentages of iso-butylene, di-iso-butylene and tri-iso-butylene which were obtained in a series of tests in which iso-butylene-sulfuric acid solutions of apparent acidities varying from about 30 grams of $H_2SO_4$ per 100 cc. of solution to about 95 grams of $H_2SO_4$ per 100 cc. of solution were warmed to effect polymerization of the iso-butylene.

Table I

| | Solution | | Polymerization | | | | |
|---|---|---|---|---|---|---|---|
| No. | Sp. g. | Grams $H_2SO_4$ per 100 cc. sol. | Percent to iso-butylene | Percent to polymer | Volatility ratio | Percent iso-butylene to di-iso-butylene | Percent iso-butylene to tri-iso-butylene |
| $B_1$ | 1.0035 | 29.75 | 37.4 | 62.6 | 3.81 | 49.7 | 13.0 |
| $B_2$ | 1.0097 | 41.45 | 13.6 | 86.4 | 3.31 | 66.9 | 19.4 |
| $B_3$ | 1.172 | 49.95 | 5.4 | 94.5 | 2.95 | 70.7 | 23.9 |
| $B_4$ | 1.226 | 55.5 | 5.2 | 94.8 | 2.85 | 67.1 | 23.6 |
| $B_5$ | 1.2905 | 63.65 | 1.4 | 98.6 | 2.45 | 70.0 | 28.6 |
| $B_6$ | 1.3745 | 74.8 | 0.3 | 99.7 | 1.74 | 63.3 | 36.4 |
| $B_7$ | 1.411 | 80.3 | 2.1 | 97.9 | 1.93 | 64.6 | 33.3 |
| $B_8$ | 1.452 | 86.3 | 1.6 | 98.4 | 1.37 | 56.8 | 41.6 |
| $B_9$ | 1.491 | 91.6 | 1.3 | 98.7 | 1.05 | 50.3 | 48.3 |
| $B_{10}$ | 1.510 | 94.6 | 0.7 | 99.3 | 0.16 | 14.0 | 85.5 |

Table II shows the results obtained when iso-butylene-sulfuric acid solutions of various apparent acidities were polymerized by heating at temperatures of 100° C. and a pressure of 65 to 115 pounds. It will be observed that the data given in this table show that the curves for the percentage yield of polymer, of dimer and of trimer obtained when the reaction is carried out at higher pressures have the same general characteristics as the curves shown in the drawings and that the principal advantage obtained in operating at these pressures is to slightly decrease the amount of unconverted iso-butylene and increase the yield of di-iso-butylene.

Table II

| No. | Grams $H_2SO_4$ per 100 cc. solution | Polymerization | | | | | |
|---|---|---|---|---|---|---|---|
| | | Percent to iso-butylene | Percent to polymer | Volatility ratio | Specific gravity | Percent dimer | Percent trimer |
| $C_1$ | 29.2 | 31.5 | 65.5 | 4.4 | .724 | 55.8 | 12.7 |
| $C_2$ | 40.2 | 12.1 | 84.3 | 4.04 | .723 | 70.5 | 17.4 |
| $C_3$ | 48.3 | 6.1 | 88.8 | 3.45 | .725 | 72.8 | 21.1 |
| $C_4$ | 62.0 | 1.6 | 93.3 | 2.64 | .729 | 71.4 | 27.0 |

We have found that the best practical combination of conditions for the production of di-iso-butylene in good yield is at an apparent acidity of 45 to 70 grams of $H_2SO_4$ per 100 cc. of iso-butylene-sulfuric acid solution at the time of polymerization whether or not ordinary pressures or elevated pressures are used. Within this range of acidity the iso-butylene coming off unchanged reaches a low value and the percentage yield of di-iso-butylene is high. When greater yields of tri-iso-butylene and correspondingly small yields of di-iso-butylene are wanted the best results are obtained at acidities in excess of 70 grams of $H_2SO_4$ per 100 cc. of iso-butylene-sulfuric acid solution and maximum yields of tri-iso-butylene are obtained in solutions having apparent acidities of 90 to 95 grams of $H_2SO_4$ per 100 cc. of iso-butylene-sulfuric acid solution at the time of polymerization whether or not elevated pressures are used.

In operating the process in a continuous manner on the countercurrent principle it is generally advantageous to charge an acid of about 98 grams of $H_2SO_4$ per 100 cc. with iso-butylene to the maximum extent and then raise the acidity to the desired point by the addition of uncharged acid. Another expedient with countercurrent operation is to send the acid past the hydrocarbon liquid in such amount and at such a rate of speed that the liquid does not fully charge it so that the effluent exhibits an apparent acidity as desired.

In operating with gases or vapors containing iso-butylene the same considerations apply as when operating with liquids containing iso-butylene. The iso-butylene-sulfuric acid solution is brought to the same apparent acidity at the time of polymerization.

Countercurrent contact between the acid and the iso-butylene either as liquid or as vapor is advantageous for apparatus considerations. In countercurrent work it is somewhat easier to produce a fully saturated acid than acid of less saturation. For this reason, in countercurrent work we generally produce saturation and then mix the charged acid with uncharged acid of the same strength.

A great convenience of the described method is that the same strength of sulfuric acid can be used throughout, there being neither dilution nor substantial concentration. The advantage of this in recycling is obvious. There is no necessary loss of $H_2SO_4$ from the system and none occurs in the absence of destructive side reactions. Side reactions are infrequent with 63 per cent sulfuric acid by weight. However, it is sometimes expedient when adding acid to add it in somewhat more dilute condition so as to compensate for loss of water by evaporation to the unabsorbed gases leaving the absorption chamber.

In practicing the invention in a manner directed to the production of di-iso-butylene in high yield, a sulfuric acid solution containing 63.5 per cent by weight sulfuric acid is continuously brought into contact with liquefied butane cut introduced under the vapor pressure of the butane cut which is about 50 pounds at the temperature used. The absorption of the iso-butylene takes place in continuous countercurrent flow. The effluent solution is drawn off and subjected to heat exchange to bring the temperature of the solution to about 80° to 100° C. The heating requires about five to ten minutes. Unchanged iso-butylene comes off as a vapor and is collected for recycling. Polymerization takes place in the warmed liquid and the liquid separates into two layers: an underlying acid layer and a supernatant layer of the polymer. The liquids are passed into a separating zone maintained at operating pressure and the polymer is drawn off and fractionated to separate and recover di-iso-butylene and tri-iso-butylene. The acid is cooled to room temperature and recirculated. Any iso-butylene liberated on the polymerization step is recycled.

In adjusting the acidity of the effluent solution a suitable portion of 63.5 per cent by weight sulfuric acid is added to the solution. This acid has a specific gravity of 1.540 and contains 98 grams $H_2SO_4$ per 100 cc. If it is desired to have an acidity of 45 grams of sulfuric acid per 100 cc.

of iso-butylene-sulfuric acid solution, the 63.5 per cent acid is added to the effluent from the reaction tank in proportion of about 0.3 part acid per part of solution.

The following experiment illustrates results obtainable in carrying out our invention in a manner designed to produce a substantial yield of di-iso-butylene. 600 cc. of a sulfuric acid solution containing 98 grams of $H_2SO_4$ per 100 cc. were treated with debutanizer gas until no more iso-butylene was absorbed. The resulting iso-butylene-sulfuric acid solution had a volume of 1840 cc. having an apparent acidity (titrated) of 29.75 grams of $H_2SO_4$ per 100 cc. of solution. To this solution was added 736 cc. of fresh sulfuric acid solution containing 98 grams of $H_2SO_4$ per 100 cc. of solution to produce a solution having an apparent acidity of 49.95 grams of $H_2SO_4$ per 100 cc. of solution. This iso-butylene-sulfuric acid solution was heated for 30 minutes at a temperature of 100° C. to bring about polymerization. During this heating about 5.4 per cent of the contained iso-butylene was given off as gas. On quiescence, separation of the mixture into two layers occurred, there appearing a lower layer of acid and a layer of polymer floating thereon. Upon separation of the two layers 1185 cc. of polymer were recovered. The polymer was alkali washed and distilled. The di-iso-butylene fraction was collected at temperatures up to 140° C. and a yield of 885 cc. was obtained representing a yield of 70.7 per cent of dimer. 300 cc. of tri-iso-butylene fraction were collected at temperatures above 140° C. which constitutes a yield of about 23.9 per cent of the original iso-butylene. The polymer had a volatility ratio of 2.95.

In a batch operation directed to the production of tri-iso-butylene in substantial yield, 1500 cc. of a sulfuric acid solution containing 98 grams of $H_2SO_4$ per 100 cc. of solution were treated with 808 grams of liquefied debutanizer gas at room temperature and at a pressure corresponding to the vapor pressure of the liquefied gas for a period of sixty minutes. From this treatment there was obtained 1818 cc. of an iso-butylene-sulfuric acid solution having an apparent acidity (titrated) of 80.3 grams of $H_2SO_4$ per 100 cc. of solution. This iso-butylene-sulfuric acid solution was heated for thirty minutes at a temperature of about 100° C. to bring about polymerization. On quiescence, separation of the mixture into two layers occurred, there appearing a lower layer of acid and a layer of polymer floating thereon. Upon separation of the polymer from the acid there was recovered 282 cc. of polymer. The polymer was alkali washed and distilled. At temperatures up to 140° C., 65.0 per cent distilled. This was the di-iso-butylene fraction. At temperatures above 140° C. a fraction of 34.1 per cent was recovered which represents the yield of tri-iso-butylene. This polymer had a volatility ratio of 1.93.

As so far described, iso-butylene is removed from a butane cut leaving behind the other butylenes. These can also be converted into valuable fuel materials by other methods of polymerization. In one such method the residual primary and secondary butylenes not adsorbed by the acid during the charging step are compressed and passed into an elongated reaction zone containing phosphoric acid of about 85 per cent by weight. In conjunction with a small amount (about 3 per cent) of concentrated sulfuric acid carried on a suitable carrier, for example, kieselguhr or pumice, the temperature was maintained at 150 to 200° C. under a pressure of 150 to 200 pounds. The rate of flow was adjusted so that the gas remained in contact with the catalyst about 4 minutes. Vapors came up at the effluent end of the reaction vessel which were then cooled. These vapors contain polymers mainly the dimers and trimers of 1 and 2 butylene. There were also some unchanged normal butane and iso-butane.

The addition of the small amount of sulfuric acid to the phosphoric acid catalyst is advantageous, as the polymer production per pound of catalyst is thereby markedly increased.

We have found that polymerization of the butylenes is aided by the presence of the iso-butylene. Accordingly, in a modification of the present process the butane cut acid adsorption step can be modified either as to time of contact or as to relative volumes of butane cut and acid, so as to leave a little iso-butylene in the gases escaping from this step. Alternatively, a little iso-butylene may be diverted from the iso-butylene being recycled and supplied to the butylene gases.

This application is a continuation-in-part of our copending application Serial No. 54,336 filed December 13, 1935.

What we claim is:

1. In the manufacture of polymer consisting substantially of di-iso-butylene and tri-iso-butylene, the process which comprises taking up iso-butylene in 60 to 65 per cent sulfuric acid solution and polymerizing the iso-butylene contained in the acid while maintaining the concentration of the sulfuric acid on a hydrocarbon-free basis substantially constant, the apparent acidity of the iso-butylene-sulfuric acid solution at the time of said polymerization being 45 to 95 grams of $H_2SO_4$ per 100 cc. of iso-butylene-sulfuric acid solution, whereby at least about 90 per cent of said iso-butylene is polymerized.

2. In the manufacture of polymer consisting substantially of di-iso-butylene and tri-iso-butylene, the process which comprises taking up iso-butylene in 60 to 65 per cent sulfuric acid solution, adjusting the apparent acidity of the iso-butylene-sulfuric acid solution to 45 to 95 grams of $H_2SO_4$ per 100 cc. of solution, while maintaining the concentration of the sulfuric acid on a hydrocarbon-free basis substantially constant and heating the solution until the polymer separates out, whereby at least about 90 per cent of said iso-butylene is polymerized.

3. In the manufacture of polymer consisting substantially of di-iso-butylene and tri-iso-butylene and containing a maximum amount of di-iso-butylene, the process which comprises taking up iso-butylene in 60 to 65 per cent sulfuric acid solution, adjusting the apparent acidity of the iso-butylene-sulfuric acid solution to 45-70 grams of $H_2SO_4$ per 100 cc. of solution while maintaining the concentration of the sulfuric acid on a hydrocarbon-free basis substantially constant and heating the solution until polymer separates.

4. In the manufacture of polymer consisting substantially of tri-iso-butylene, the process which comprises taking up iso-butylene in sulfuric acid solution, adjusting the apparent acidity of the iso-butylene-sulfuric acid solution to 90-95 grams of $H_2SO_4$ per 100 cc. of solution and heating the solution until polymer separates.

5. A process of producing a polymer consisting substantially of di-iso-butylene and tri-iso-butylene comprising contacting a butane cut with a sulfuric acid solution containing about 98 grams of sulfuric acid per 100 cc. of solution, adjusting the apparent acidity of the iso-butylene-sulfuric acid solution produced to 45 to 95 grams of $H_2SO_4$ per 100 cc. of solution while maintaining the concentration of the sulfuric acid on a hydrocarbon-free basis substantially constant, and heating until the polymer separates out, whereby at least about 90 percent of said iso-butylene is polymerized.

6. A process for the production of di-iso-butylene comprising producing a polymer consisting substantially of di-iso-butylene and tri-iso-butylene and containing a maximum amount of di-iso-butylene by taking up iso-butylene in a 60 to 65 percent sulfuric acid solution, adjusting the apparent acidity of the iso-butylene-sulfuric acid solution to about 45 to 70 grams of $H_2SO_4$ per 100 cc. of solution while maintaining the concentration of the sulfuric acid on a hydrocarbon-free basis substantially constant, and heating until the polymer separates out of solution, thereafter washing the polymer with dilute alkali and fractionally distilling and collecting the fraction boiling at temperatures up to 140° C.

7. A process for the production of tri-iso-butylene comprising taking up iso-butylene in a sulfuric acid solution, adjusting the apparent acidity of the iso-butylene-sulfuric acid solution to about 90 to 95 grams of $H_2SO_4$ per 100 cc. of solution, heating until the polymer separates out of solution, washing the polymer with dilute alkali and fractionally distilling and collecting the fraction boiling at temperatures above 140° C.

8. In the manufacture of polymerized iso-butylene from the iso-butylene of liquid or gas mixtures containing the same, the process which comprises taking up iso-butylene in sulfuric acid solution containing about 60 to 65 per cent by weight $H_2SO_4$, removing the acid charged with iso-butylene from contact with the iso-butylene-containing mixture and maintaining the concentration of the sulfuric acid on a hydrocarbon-free basis substantially constant while separating di-iso-butylene and tri-iso-butylene from the charged acid at an apparent acidity of 45 to 95 grams of $H_2SO_4$ per 100 cc. of the iso-butylene sulfuric acid solution, whereby at least about 90 per cent of said iso-butylene is polymerized.

9. The process of claim 8 in which adjustment of acidity is made by additions of sulfuric acid to the liquid highly charged with iso-butylene.

10. The process of claim 8 in which the sulfuric acid is passed in contact with the iso-butylene-containing mixture in such amount and at such a rate as to give an effluent liquid having an apparent acidity of 45 to 95 grams of $H_2SO_4$ per 100 cc. of said effluent liquid.

11. In the manufacture of polymerized butylene from a butane cut, the process which comprises removing most but not all of the iso-butylene by the process of claim 8 and thereafter polymerizing the remaining butylenes, these remaining butylenes including a small proportion of iso-butylene.

12. In the manufacture of polymerized iso-butylenes from the iso-butylene of a refinery butane cut, the process which comprises taking up iso-butylene in sulfuric acid of about 60 to 65 per cent strength, removing the acid charged with iso-butylene from contact with the butane cut, warming the charged acid at an apparent acidity of 45 to 95 grams of $H_2SO_4$ per 100 cc. of iso-butylene-sulfuric acid solution, whereby at least about 90 per cent of the iso-butylene is converted to di-iso-butylene and tri-iso-butylene and the remainder is driven off unpolymerized, and recycling the unpolymerized iso-butylene to the acid-charging step.

DONALD R. STEVENS.
WILLIAM A. GRUSE.